United States Patent [19]
Gore

[11] Patent Number: 5,873,095
[45] Date of Patent: Feb. 16, 1999

[54] SYSTEM AND METHOD FOR MAINTAINING CURRENT STATUS OF EMPLOYEES IN A WORK FORCE

[75] Inventor: Terence F. Gore, Plano, Tex.

[73] Assignee: Electronic Data Systems Corporation, Plano, Tex.

[21] Appl. No.: 695,282

[22] Filed: Aug. 12, 1996

[51] Int. Cl.$^6$ .................................................. G06F 17/30
[52] U.S. Cl. .............................. 707/200; 707/3; 707/10; 345/340
[58] Field of Search ................................. 707/10, 102, 3, 707/4, 104, 503, 200; 345/326, 333, 340 348, 352

[56] References Cited

U.S. PATENT DOCUMENTS

| | | | |
|---|---|---|---|
| Re. 34,476 | 12/1993 | Norwood | 382/186 |
| 5,325,292 | 6/1994 | Crookett | 364/401 |
| 5,594,847 | 1/1997 | Moursund | 395/133 |
| 5,616,899 | 4/1997 | Recigno | 235/375 |
| 5,619,688 | 4/1997 | Bosworth et al. | 395/604 |
| 5,623,613 | 4/1997 | Rowe et al. | 395/353 |
| 5,625,377 | 4/1997 | Jenson | 345/146 |
| 5,657,461 | 8/1997 | Harkins et al. | 395/333 |
| 5,664,126 | 9/1997 | Hirakawa et al. | 345/329 |
| 5,664,228 | 9/1997 | Mital | 395/882 |
| 5,682,469 | 10/1997 | Linnett et al. | 395/173 |
| 5,701,460 | 12/1997 | Kaplan et al. | 395/603 |
| 5,715,374 | 2/1998 | Herkerman et al. | 395/81 |

*Primary Examiner*—Thomas G. Black
*Assistant Examiner*—Cheryl Lewis
*Attorney, Agent, or Firm*—Anthony E. Peterman; L. Joy Griebenow

[57] ABSTRACT

A system (10) for maintaining current status for employees in a work force is provided. The system (10) includes a server system (12) providing an operating environment for a database (14). The database (14) stores and providing access to a plurality of records (16) that hold status information for employees. The system also includes a plurality of client systems (20) connected to the server system (12), each client system (20) providing an operating environment for a locator application (22). The locator application (22) is operable to: provide a user interface and receive user input; store information in and retrieve information from the database (14), change an employee's status information, and locate and display an individual employee's status information. The status information held by the records (16) in the database (14) thereby provides current status for employees in a work force.

17 Claims, 3 Drawing Sheets

SYSTEM AND METHOD FOR MAINTAINING CURRENT STATUS OF EMPLOYEES IN A WORK FORCE

TECHNICAL FIELD OF THE INVENTION

This invention relates in general to the field of electronic systems, and more particularly to a system and method for maintaining current status of employees in a work force.

BACKGROUND OF THE INVENTION

It can be important to the operation of an organization to know the status of employees within the organization's work force during the business day. For example, it can be important to know whether an employee is in the office, at lunch, in a meeting, on vacation, etc. This is especially the case for service organizations that need to have effective and timely response to client or customer needs.

A legal organization, for example, may have offices in a number of locations and have various staff and attorneys employed at the various sites. To provide responsive legal service to its clients, it can be important for the organization to know the current status of each lawyer or staff person. This status information can be helpful for a number of reasons. For example, if a client needs to talk to an attorney who is, for some reason, unavailable, someone else in the organization could check the status of the employee and provide accurate information about that person's whereabouts.

Conventional planning and scheduling software applications provide some functionality for maintaining schedules that can be accessed by other employees. These applications, however, are often limited in scope and require each user to grant access to all other users. These conventional software applications do not provide a sufficient way to maintain or access information about the current status of employees.

SUMMARY OF THE INVENTION

In accordance with the present invention, a system and method for maintaining current status of employees in a work force are provided that substantially reduce or eliminate problems and disadvantages of prior planning and scheduling applications.

According to one embodiment of the present invention, a system for maintaining current status for employees in a work force is provided. The system includes a server system providing an operating environment for a database. The database stores and provides access to a plurality of records that hold status information for employees. The system also includes a plurality of client systems connected to the server system, each client system providing an operating environment for a locator application. The locator application is operable to: provide a user interface and receive user input, store information in and retrieve information from the database, change an employee's status information, and locate and display an individual employee's status information. The status information held by the records in the database thereby provides current status for employees in a work force.

A technical advantage of the present invention is the ability to maintain and access information regarding the current status of employees in a work force such that the current status of a given employee can be determined in an efficient and timely manner.

Another technical advantage of the present invention is the use of a centralized database in a distributed client/server environment to allow storage of and access to information concerning the current status of employees in a work force distributed across a number of office sites.

BRIEF DESCRIPTION OF THE DRAWINGS

A more complete understanding of the present invention and advantages thereof may be acquired by referring to the following description taken in conjunction with the accompanying drawings in which like reference numbers indicate like features and wherein.

DETAILED DESCRIPTION OF THE INVENTION

Figure 1:
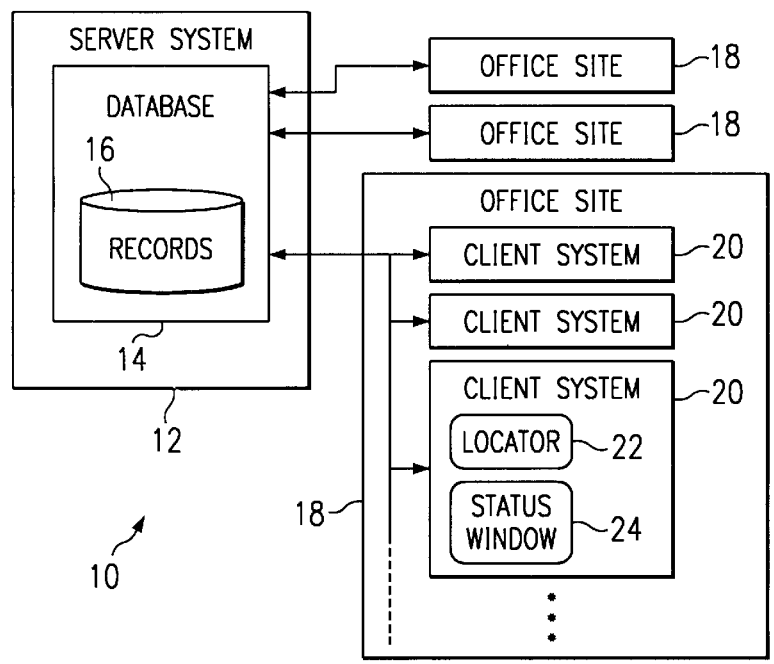
FIG. 1 is a block diagram of one embodiment of a system for maintaining current status of employees in a work force according to the teachings of the present invention.

FIG. 1 is a block diagram of one embodiment of a system, indicated generally at 10, for maintaining current status of employees in a work force according to the teachings of the present invention. System 10 includes a server system 12 which provides an operating environment for a database 14. Database 14 provides storage for and access to records 16. Server system 12 is connected to a plurality of office sites 18. Server system 12 can be located at a site that is different from office sites 18 or can be located at one of office sites 18.

Each office site 18 preferably includes at least one client system 20 that are in communication with server system 12 and can access database 14. Each client system 20 provides an operating environment for a locator application 22 and a status window application 24. Locator application 22 and status window application 24 communicate with database 14 in order to retrieve information from and write information to records 16. In one embodiment of the present invention, server system 12 provides a WINDOWS NT platform for a database 14 that comprises a MICROSOFT SQL database. In this embodiment, client systems 20 communicate with server system 12 using an IPX or a TCP/IP communication protocol (can include named pipes and banyan vines). Also in this embodiment, locator application 22 and status window application 24 communicate with database 14 using VB/SQL commands (also known ad DB-LIB).

According to the teachings of the present invention, a user of one of client systems 20 can invoke and use locator application 22 or status window application 24 in order to maintain an appropriate current status in records 16 and in order to retrieve current status information for other employees from records 16. Locator application 22 provides a user with the ability to set his current status, to view the current status of another employee, and to view a list of employees having a given status. Locator application 22 can also provide a user the ability to view the schedules for employees and to view the availability of resources (such as conference rooms). Status window application 24 provides a user with a convenient and efficient way to set and view his current status.

By having each employee maintain accurate status information in database 14 using locator application 22 or status window application 24, an organization can ensure that the current status of each employee can be determined by other employees using locator application 22 on any of client systems 20. Thus, even though employees may be distributed across a number of office sites 18, an employee at any office site 18 can determine an accurate current status of other employees in an efficient and timely manner.

The present invention provides benefits, for example, to service organizations that have specific employees who are primarily responsible for certain internal and external clients and matters, customers, vendors, business contacts, etc. Those employees frequently interact with others to a significant extent over the telephone. When employees are unavailable, the present invention allows an organization to provide an effective telephone interface with callers. For example, in a legal organization, clients often desire immediate and detailed information on the whereabouts of lawyers working on their matters. Using locator application 22, the current status for those lawyers can be retrieved and the client can be provided with accurate information about the lawyer's whereabouts. It can also be important for employees to know how to find one another in order to be responsive to other issues that require somewhat immediate attention. According the present invention, current status information is maintained in database 14 by storing information in records 16 representing the current status of each employee being tracked. This information can be changed by locator application 22 or by status window application 24 by modifying records 16 using appropriate database commands, such as by using SQL commands. Database 14 and records 16 thereby provide a central repository of information that allows efficient and timely access to the current status of employees throughout an organization's work force.

Figure 2:
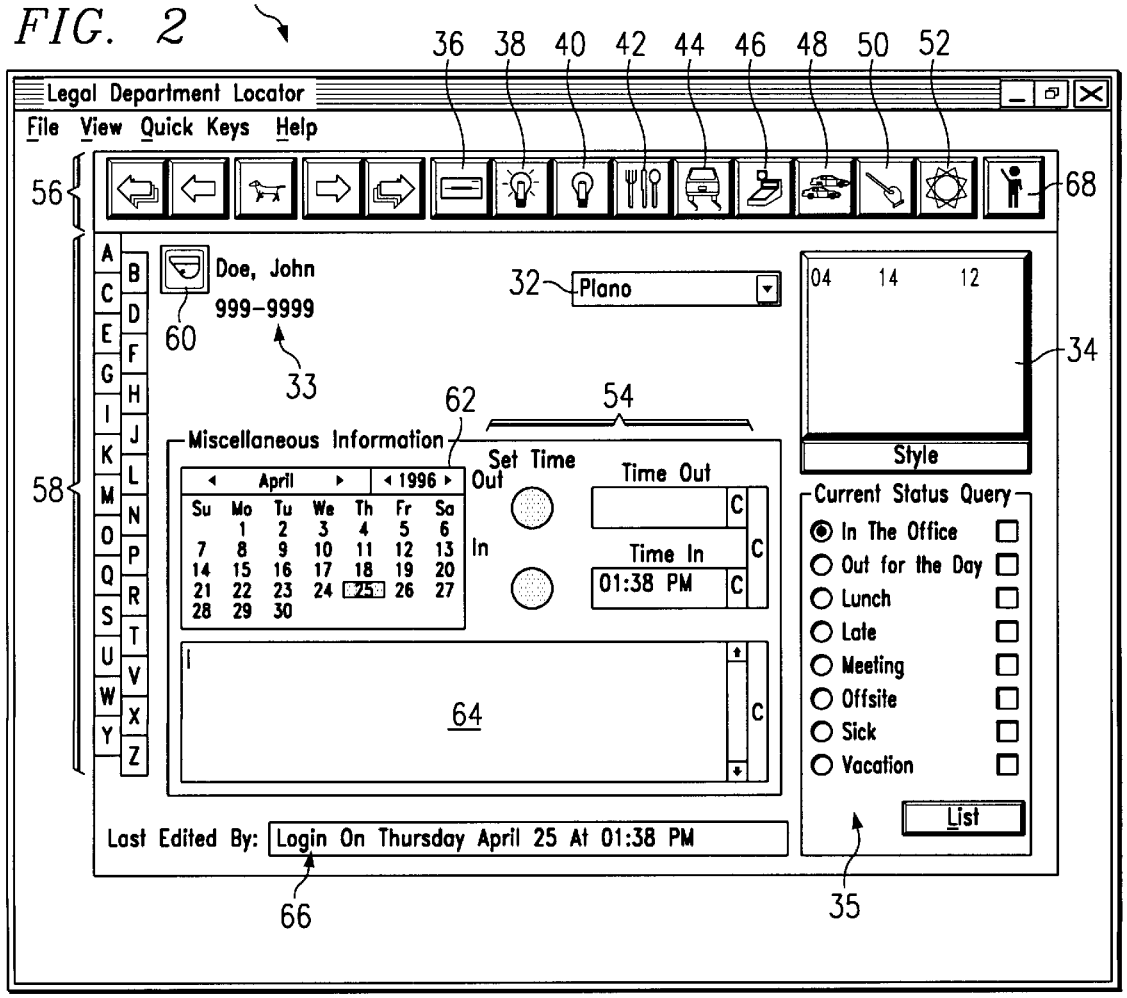
FIG. 2 is a diagram of one embodiment of a user interface for the locator application of FIG. 1.

FIG. 2 is a diagram of one embodiment of a user interface, indicated generally at 30, for locator application 22 of FIG. 1. User interface 30 includes a pull-down list 32 for selecting an appropriate office site which can include each office site within an organization. Within user interface 30, an employee name region 33 provides the name and phone number for the employee whose current status information is being viewed. A window 34 preferably provides either a picture of that employee or a default logo appropriate for the organization. User interface 30 includes a current status region 35 that shows the current status of the employee whose information is being viewed as well as query boxes which can be selected in order to retrieve a list of all employees matching the selected status.

User interface 30 further includes a plurality of buttons that provide access to certain functions of locator application 22. These buttons preferably include a plurality of status buttons: "SAVE" button 36, "IN" button 38, "OUT" button 40, "LUNCH" button 42, "LATE" button 44, "MEETING" button 46, "OFF-SITE" button 48, "SICK" button 50, and "VACATION" button 52. User interface 30 also includes a "TIME OUT/TIME IN" region 54 for setting the expected duration of certain activities such as lunch or a meeting. A plurality of search buttons 56 and alphabet buttons 58 provide functions for finding status information concerning a selected employee. User interface 30 also includes an e-mail (MAPI-MS Mail) button 60, a calendar area 62, and a comments area 64. An edit log 66 provides information concerning how the last change was made to the status information being viewed. User interface 30 further includes a "LOG-OUT" button 68.

Locator application 22 can be set as a default to open to a given employee record and office site. For example, locator application 22 can initially open to the record and office site for the log-in account. Locator application 22 shows the current status of the employee named in region 33 in current status region 35. Information on employees in other office sites could be accessed by selecting the down arrow in pull-down list 32 and selecting a new office site. Locator application 22 allows the user to select any of the status items to activate that status selection and change the status of the given employee to the new status. This function can be accomplished either by an employee or someone authorized by the employee to change that employee's status (such as, for example, an administrative assistant). When the status selection is altered, changes can be saved to database 14 either when the user moves to another record or when the user selects "SAVE" button 36. Locator application 22 also can provide an automatic check-in when a user logs into the organization's network using a client system 20. In one embodiment of the present invention, this automatic check-in is implemented by adding that function to the start-up file for the client system 20. In this manner, the current status of each employee can be automatically set to "IN" when the employee logs into the organization's network or system, and the employee can be shown a window indicating that his current status has been updated to "IN".

The buttons extending across the upper right-hand side of window 30 allow a current status to be set for an employee and can automatically update and save the new status. When any of these buttons are selected, the current status for the employee shown will be set to the appropriate status for the selected button. Selecting "IN" button 38 will check the employee into the office and will note the time in. Selecting "OUT" button 40 will check the employee out for the day and will note the time out. Selecting "LUNCH" button 42 will log the employee as out to lunch, noting the time out and providing a notation for the time in region 54. By selecting the "MEETING" button 46, the employee will be logged out to a meeting, noting the time out. The time back in can be left blank in region 54 which can be filled in by the employee. The "LATE" button 44, "OFF-SITE" button 48, "SICK" button 50, and "VACATION" button 52 also update the employee's record accordingly.

The "TIME OUT/TIME IN" region 54 provides entries that can be updated either by selecting specific buttons, as discussed above, or by manually typing in the information. By selecting the space provided and typing in information, an employee can provide information for "TIME IN" and "TIME OUT" for his current status. Another way of setting these times is to use the clocks located in the left-hand portion of "TIME OUT/TIME IN" region 54. The time listed in the "TIME OUT/TIME IN" region 54 can be cleared by clicking on any of the "C" bars located next to each time section.

Locator application 22 can be used to determine the current status for every employee within the organization. According to the present invention, to access another employee's status information, a user can use search buttons 56 or alphabet buttons 58. In the particular embodiment illustrated in FIG. 2, using search buttons 56, the triple left arrow will move to the first employee record, and the single left arrow will move to the prior employee record. The triple right arrow will move to the last employee record, and the single right arrow will move to the next employee record. In this embodiment, the records are arranged according to alphabetical order of employee's last names. The middle search button 56 provides a "FIND" function so that a user can find a specific employee name. For example, the user can type any number of letters of the person's name and press "ENTER". Employee records can also be access by clicking on alphabet buttons 58 provided on the left-hand side of user interface 30. These alphabet buttons 58 move to the first employee name under the selected letter. It should be understood, by using either set of buttons, any employee's current status information can be determined in both an efficient and timely manner.

In one embodiment, locator application 22 also allows a user to generate a list of all employees who have a certain current status. By selecting one or more of the query boxes within current status region 35, and then selecting the "LIST" button, the user can retrieve a list of employees having the queried status. Locator application 22 generates this list by querying database 14 using the status selections according to the selected query boxes.

Locator application 22 preferably provides additional functionality such as "E-MAIL" button 60 which allows a user to send a mail message directly to the employee whose record is being viewed. In one embodiment of the present invention, "E-MAIL" button 60 provides access for sending a MICROSOFT MAIL message. Additional functionality is provided by comment section 64 which allows the entry of specific information regarding daily activities or other information which may be useful for other employees. For example, a daily agenda could be entered into comment section 64. Calendar 62 provides the current date as well as a weekly calendar for the given month or year. The user can scroll forward or backward by month and year by selecting the arrows next to the month name and year. The window 34 also provides a clock showing the current time as well as a photograph of the person whose record is being viewed, if available.

Locator application 22 can also allow a user to double click on a specific calendar date to view the schedule for that day in thirty minute time intervals. From the daily schedule, a user can set appointments that can be password protected. Dates on the calendar 62 with appointments will then display as colored or shaded.

Locator application 22 can also incorporate options allowing a user to drag and prop a vacation or travel icon on a date on the calendar 62 to represent days gone. Locator application 22 can also incorporate a telephone icon that a user can double click to display other employees' phone numbers and/or home addresses.

Figure 3:
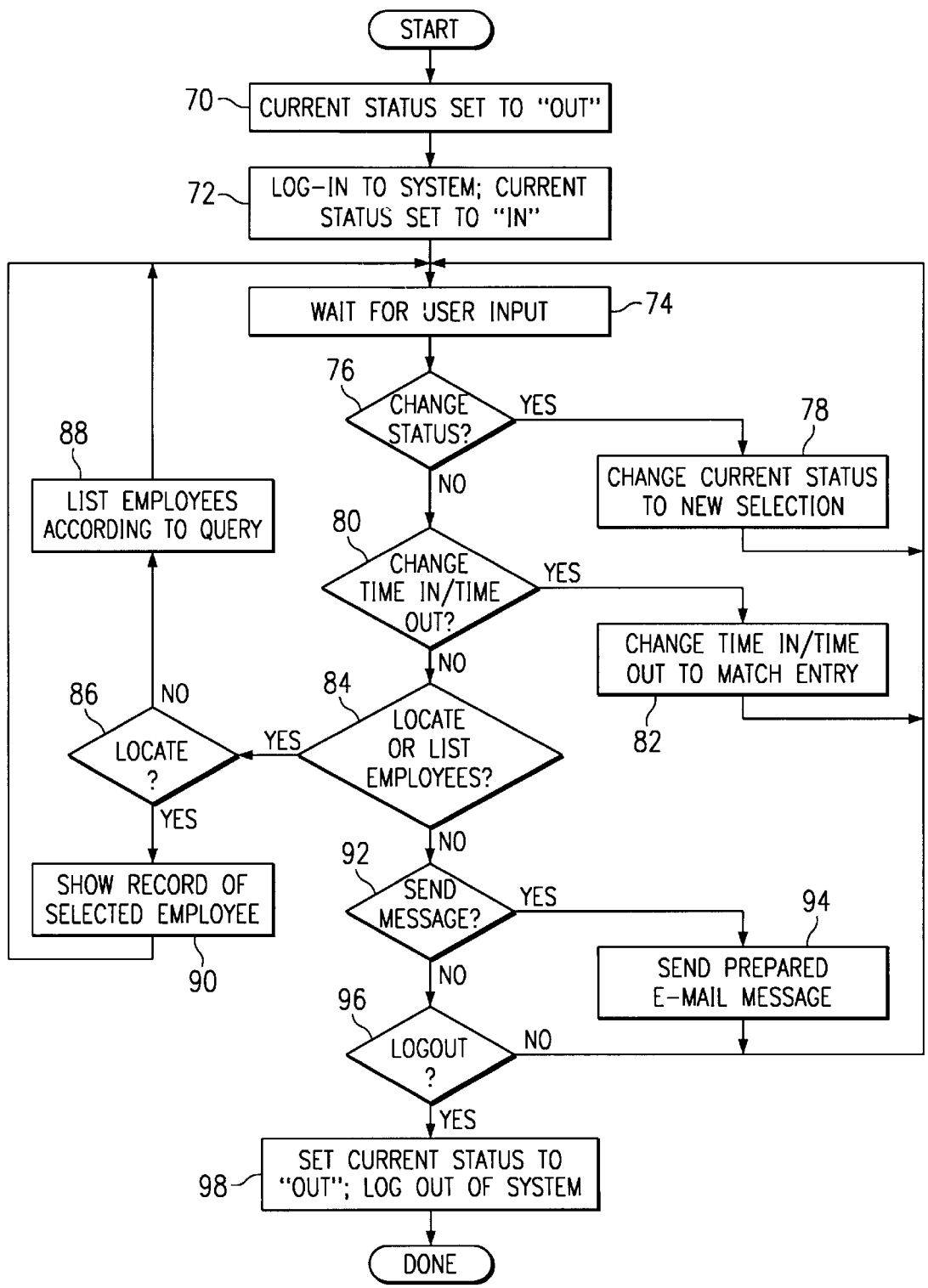
FIG. 3 is a flow chart of one embodiment of a method of operation of a locator application according to the teachings of the present invention.

FIG. 3 is a flow chart of one embodiment of a method of operation for the locator application of FIG. 1. In step 70, prior to initiation of the locator application for a given day, each employee has his status set to "OUT". In step 72, when an employee logs into the organization's computer network or system, the employee's status can automatically be set to "IN". In one embodiment, the employee is provided with a temporary window informing the employee about the automatic setting of status and allowing the employee to change the status to another setting, if desired.

In step 74, the locator application waits for user input. After user input is received, the locator application processes the user input. In step 76, the locator application determines whether the user input was to change the status for an employee. If so, in step 78, the locator application changes the selected employee's status to the new designated status and returns to step 74 to wait for further user input. In step 80, the locator application determines whether the user input was to change the "TIME OUT/TIME IN" for an employee. If so, in step 82, the locator application changes the "TIME OUT/TIME IN" entry according to the user input and returns to step 74 to wait for further user input. In step 84, the locator application determines whether the user input was to request a record of an individual employee or to request the generation of a list of employees having a queried status. If so, the locator application determines, in step 86, whether the input was to locate an individual employee or generate a list. If a list is desired, then, in step 88, the locator application queries the database and displays a list of employees having a status matching the queried status. If an individual record is desired, the locator application, in step 90, retrieves and shows the specified employee record for the selected employee. In step 92, the locator application determines whether the user input was a request to send a message. If so, in step 94, the locator application allows the user to prepare and send an e-mail message to the employee whose record is currently being displayed. In step 96, the locator application determines whether the user input was to log-out of the organization's computer network or system. If not, the locator application returns to step 74 to wait for further user input. If so, in step 98, the locator application sets the employee status to "OUT" and logs the employee out of the organization's computer network or system.

Figure 4:
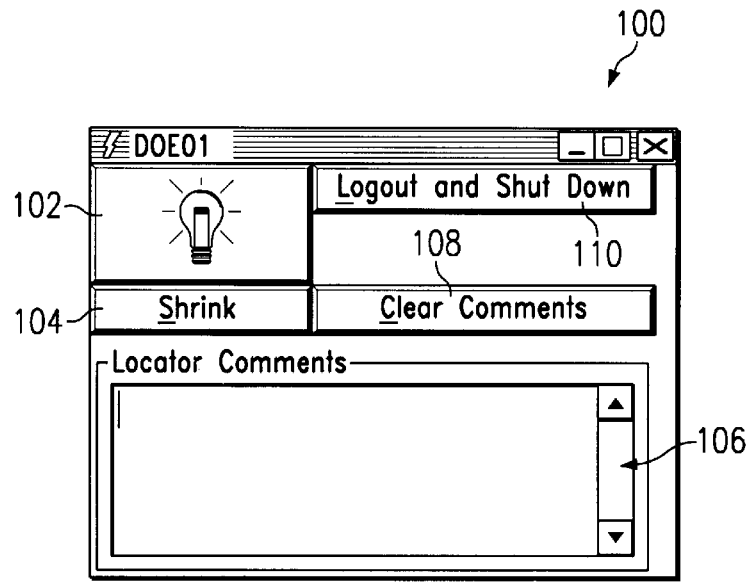
FIG. 4 is a diagram of one embodiment of a user interface for the status window application of FIG. 1.

FIG. 4 is a diagram of one embodiment of a user interface, indicated generally at 100, for status window application 24 of FIG. 1. As shown, user interface 100 also preferably includes a status icon 102 which shows the current status of the user (currently "IN" in FIG. 4). User interface 100 also includes a "SHRINK/EXPAND" button 104 which either expands user interface 100 to show a comments region 106 or shrinks user interface 100 to hide comments region 106. User interface 100 also includes a "CLEAR COMMENTS" button 108 for clearing the information written in comments region 106. User interface 100 further includes a "LOG-OUT" button 110 that allows an employee to log-out of the organization's network or system and can also shut down the client system 18 the employee is using.

After invoking status window application 24 from a client system, an employee is shown user interface 100 which displays the employee's current status. The employee can then use status window application 24 to change status and, if desired, to create comments concerning his status as well as to log-out. User interface 100 can remain open while the employee uses other applications on client system 18 such as a word processor, spread sheet, etc. An employee can use status window application 24 as a short-cut application and avoid use of locator application 22 when the employee does not need all of the functionality of locator application 22. In one embodiment, status window application 24 can be added to the start-up file for client system 18 so that status window application 24 is opened each time the user logs into the organization's network or system.

To change his current status using status window application 24, the employee can select and change status icon 102 until status icon 102 corresponds to the desired status. Status window application 24 then updates the employee's record 16 in database 14 to reflect the new current status for the employee. The employee can also use comment region 106 to prepare comments concerning the employee's status. Status window application 24 will then update the employee's record 16 in database 14 to include the comments. When other employees use locator application 22 to view this employee's record, the record will show this employee's status and comments as established using status window application 24. In this manner, status window application 24 provides abbreviated and quicker access to some of the functionality of locator application 22.

Figure 5:
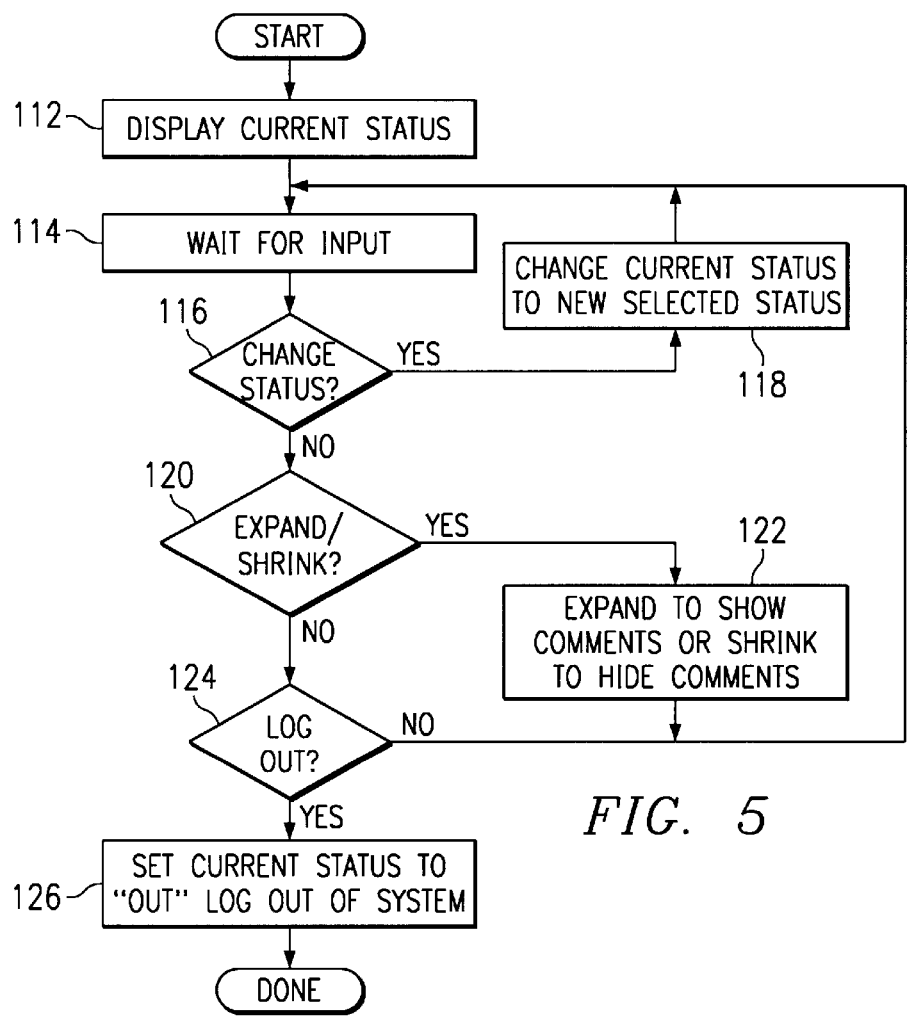
FIG. 5 is a flow chart of one embodiment of a method of operation of the status window application of FIG. 1.

FIG. 5 is a flow chart of a method of operation for the status window application of FIG. 1. In step 112, the status window application is being executed and shows, in the user interface, the current status for the employee. In step 114, the status window application waits for user input. After receiving user input, the status window application processes the user input. In step 116, the status window application determines whether the user input was to change the status of the employee. If so, in step 118, the status window application changes the employee's status to the new selected status. In step 120, the status window application determines whether the user input was to request to expand or shrink the comment region. If so, in step 122, the status window application either expands or shrinks user interface to show or hide the comments region. In step 124, the status window application determines whether the user input was to log-out of the system. If not, the status window application returns to step 114 to wait for further user input. If so, the status window application, in step 126, sets the user status to "OUT" and logs the user out of the organization's computer network or system.

Although the present invention has been described in detail, it should be understood that various changes, substitutions and alterations can be made hereto without departing from the spirit and scope of the invention as defined by the appended claims.

What is claimed is:

1. A system for maintaining current status for employees in a work force, comprising,
   a server system providing an operating environment for a database, the database storing and providing access to a plurality of records that hold status information for employees, and the status information representing at least whether each employee is currently in or out of an office; and
   a plurality of client systems connected to the server system, each client system providing an operating environment for a locator application;
   the locator application operable to:
     provide a user interface and receive user input;
     store status information in and retrieve status information from the database;
     change an employee's status information responsive to user input; and
     locate and display an individual employee's status information
   such that the status information held by the records in the database provide current availability of employees in a work force.

2. The system of claim 1, wherein the locator application is further operable to generate and display a list of employees whose status information matches a query.

3. The system of claim 1, wherein each client system further provides an operating environment for a status window application, the status window application operable to:
   provide a user interface and receive user input;
   store status information in and retrieve status information from the database; and
   change an employee's status information responsive to the user input.

4. The system of claim 1, wherein the plurality of client systems are located in a plurality of office sites, with at least one client system at each office site.

5. The system of claim 1, wherein the status information further represents whether each employee is currently at a meeting.

6. The system of claim 5, wherein the status information further represents whether each employee is currently on a vacation.

7. A system for maintaining current status for employees in a work force, comprising,
   a server system providing an operating environment for a database, the database storing and providing access to a plurality of records that hold status information for employees, and the status information representing at least whether each employee is currently in or out of an office; and
   a plurality of client systems connected to the server system and located in a plurality of office sites, at least one client system at each office site, and each client system providing an operating environment for a locator application and a status window application;
   the locator application operable to:
     change an employee's status information responsive to user input
     locate and display an individual employee's status information; and
     generate and display a list of employees whose status information matches a query; and
   the status window application operable to:
     change an employee's status information responsive to the user input;
   such that the status information held by the records in the database provide current availability of employees in a work force.

8. The system of claim 7, wherein the locator application is further operable to:
   provide a user interface and receive user input; and
   store status information in and retrieve status information from the database.

9. The system of claim 7, wherein the status window application is further operable to:
   provide a user interface and receive user input; and
   store status information in and retrieve status information from the database.

10. The system of claim 7, wherein the status information further represents whether each employee is currently at a meeting.

11. The system of claim 10, wherein the status information further represents whether each employee is currently on a vacation.

12. A method for maintaining current status for employees in a work force, comprising,
    storing and providing access to a plurality of records in a database on a server system that hold status information for employees, and the status information representing at least whether each employee is currently in or out of an office;
    providing a user interface and receiving user input in a plurality of client systems;
    storing status information in and retrieving status information from the records in the database;
    performing status information functions comprising:
      changing an employee's status information responsive to user input; and
      locating and displaying an individual employee's status information
    such that the status information held by the records in the database provide current availability of employees in a work force.

13. The method of claim 12, further comprising performing status information functions of generating and displaying a list of employees whose status information matches a query.

14. The method of claim 12, further comprising providing a status window that allows a user to change an employee's status information responsive to the user input.

15. The method of claim 12, wherein providing a user interface and receiving user input is accomplished using a plurality of client systems that are located in a plurality of office sites, at least one client system at each office site.

16. The system of claim 12, wherein the status information further represents whether each employee is currently at a meeting.

17. The system of claim 16, wherein the status information further represents whether each employee is currently on a vacation.

\* \* \* \* \*